Nov. 10, 1942.  W. GOETZELMAN  2,301,776
BOX WITH CABLE CLAMPS
Filed Sept. 21, 1940
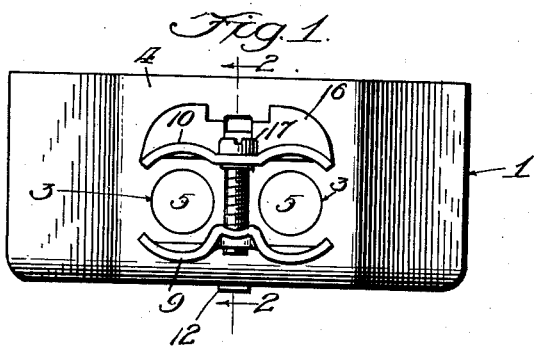
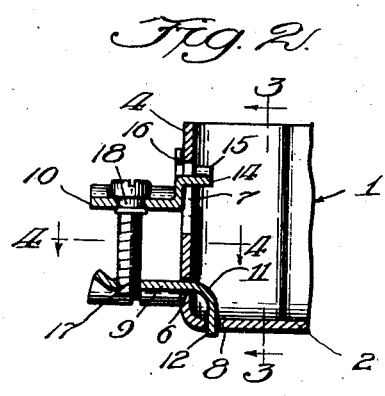
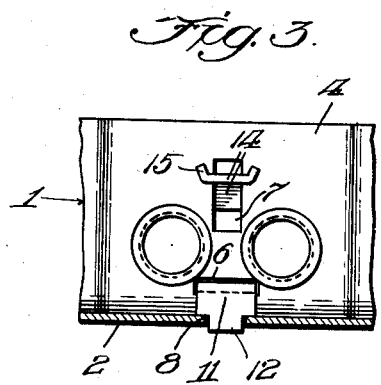
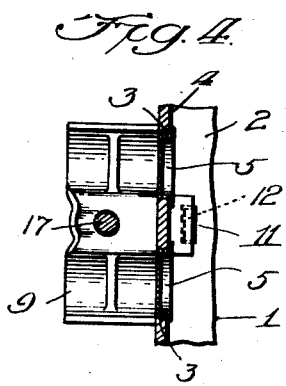
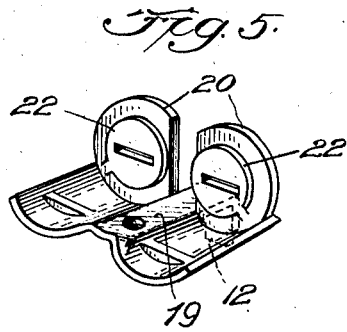

Patented Nov. 10, 1942

2,301,776

UNITED STATES PATENT OFFICE 2,301,776

BOX WITH CABLE CLAMPS

William Goetzelman, Chicago, Ill., assignor to Appleton Electric Company, a corporation of Illinois Application September 21, 1940, Serial No. 357,747

7 Claims. (Cl. 285—35.2)

The object of the present invention is to produce a cable clamp for association with an outlet box or the like, which shall be efficient, easily applied and operated, and which, at the same time, may be manufactured at a low cost.

In carrying out my invention in its preferred form, I construct the clamp of two sheet metal stampings joined together by a screw which serves to draw the two clamping members together and grip a cable or cables. A further object of the present invention is so to shape the stampings that by simply providing proper openings in a wall or walls of a box, the stampings may be interlocked with a box, before being secured together by the screw, and then be held to the box upon the insertion of the screw and until the screw is again removed.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side view of an ordinary connection box or switch box having one of my improved clamps applied thereto; Fig. 2 is a section on line 2—2 of Fig. 1; Fig. 3 is a section on line 3—3 of Fig. 2; Fig. 4 is a section on line 4—4 of Fig. 2; and Fig. 5 is a perspective view of a modified form of lower clamp.

Referring to Figs. 1 to 4, I represents a sheet metal box having a bottom wall 2 and a pair of round openings 3 in a side wall 4; the openings being toward the bottom and a line connecting the centers thereof being parallel with the bottom wall. These openings may be closed, until they are needed, in any suitable way. In the arrangement shown, the closures are little pan-shaped sheet metal plugs 5 of such size that when pressed into the openings they are frictionally held therein with sufficient force to prevent them from jarring loose and dropping out until they are intentionally removed.

In the wall 4 are two slots, one of which, 6, is a long transverse slot whose long axis is parallel with the bottom wall of the box, while the other, 7, is a long slot whose long axis is at right angles to the bottom wall of the box. The transverse slot lies below the openings 3 and only a short distance above the bottom of the box, while the vertical slot lies mainly above these openings. The long axis of the vertical slot and the short axis of the transverse slot are on a vertical line lying midway between the two openings. In the bottom wall of the box, near the side wall 4, just behind the center of the slot 6, is a little slot or hole 8. Thus, the box may be any one of the usual types modified only by having the three additional slots.

The actual clamping device is composed of two sheet metal clamps 9 and 10 of any usual or suitable shapes and styles, the principal requirement being that they shall be long enough to span the two openings in the box wall. The lower clamp member 9 is provided at the middle with a long rearwardly-extending arm 11, almost as wide as the length of the slot 6, that extends loosely through this slot and is bent downwardly at its free end so that its extreme edge face may bear against the upper face of the bottom wall of the box. The end of the arm is provided with a narrow portion or finger 12 that extends through the little slot or hole 8 in the bottom of the box. It will be seen that the lower clamp member may be engaged with the box by simply inserting the end of the arm in the slot 6 and then swinging the clamp up until the shoulders at the end of the arm, beside the finger portion 12, strike the bottom wall of the box. At this time, the clamp is in the position of a shelf projecting outwardly at right angles from the side of the box and, while it may drop down if not provided with additional support, it cannot swing up any farther.

The upper clamp has at the center a rearwardly-projecting T-shaped lug 14, the stem portion of which is only about as long as the thickness of the box wall, while the head or cross arm 15 is longer than the width of the slot 7, but of shorter length than that slot. The cross arm or head lies generally in a plane parallel with that of the body portion of the clamp. Therefore, when the clamp 10 is placed on edge in an upright position, with the lug registering with the slot 7, the head of the lug may be pushed through the slot. Then, by turning the clamp through an angle of ninety degrees, to bring it parallel with the clamp 9, the head or cross arm overlaps the inner surface of the side wall 4 at opposite sides of the slot and prevents the lug from being pulled out of the slot. The member 10 has also a deep flange 16 extending upwardly along the rear edge, this flange engaging with the wall of the box and providing a bearing of large area between the member 10 and the box. This construction insures that this clamp member shall always stand at right angles to the box, although it can move bodily up and down within the limits permitted by the slot 7.

The two clamp members are connected together by a screw 17 which has a swivel connection 18 with the upper member 10 at the head end of the screw, while the other end is screwed into the lower member 9; the swivel connection permitting the screw to turn in but not to move lengthwise relatively to the upper clamping member. When the parts are assembled, as shown in the drawing, with the screw in place, the clamp device is fastened to the box in such a manner that it cannot be detached without first unscrewing the screw from the lower clamp member. It will furthermore be seen that if the clamp members are parallel at the time the screw is engaged with the lower clamp member, such parallelism will thereafter be maintained. This is because the upper clamp member must always remain at right angles to the box wall and simply moves up or down as the screw is turned, without permitting the lower clamp member to swing down from its shelf-like position.

The clamp may be attached to the box in the factory, so that the user need only take out the plugs 5, insert the cables, and tighten the clamp upon the latter in making an installation. On the other hand, the clamp may be supplied as a separate unit and be attached to the box by the user. At any rate, it will be seen that the clamp is very simple and inexpensive to manufacture, and that it is rugged, cannot accidentally become detached after having once been applied to a box, and offers no difficulties in using the same for its intended purpose.

In the event that the separate closures 5 for the cable-receiving openings in the box are not desired, one of the clamp members may be provided with a skirt having therein knockouts registering with such openings. Thus, in Fig. 5, the clamp member 19, corresponding to the lower member 9 heretofore described, may have a deep, upwardly-directed flange or skirt 20, a central section of which is partially cut away to form the arm 11 with its finger 12. Each half flange, remaining, contains a little knock-out 22.

While I have illustrated and described with particularity only the single preferred form of my invention, with a single modification, I do not desire to be limited to the exact structural details thus illustrated and described; but intend to cover all forms and arrangements which come within the definitions of my invention constituting the appended claims.

I claim:

1. In combination, a box wall having a pair of openings for the passage of conductors, a clamp member in the form of a shelf projecting outwardly from the wall on one side of said openings, a second clamp member on the outside of said wall on the other side of said openings and interlocked with the wall to adapt it to move from and toward said shelf, and a screw extending through the middle of the second clamp member and screw-threaded into the shelf, the screw and the second clamp member being interlocked to permit the screw to turn and cause it to be held against lengthwise movements relative to that member.

2. In combination, a box wall having a pair of openings for the passage of conductors, a clamp member in the form of a shelf projecting outwardly from the wall on one side of said openings, a second clamp member on the outside of said wall on the other side of said openings and interlocked with the wall to hold it at right angles to the latter and adapt it to move from and toward said shelf, and a screw extending through the middle of the second clamp member and screw-threaded into the shelf, the screw and the second clamp member being interlocked to permit the screw to turn and cause it to be held against lengthwise movements relative to that member, the said shelf being detachably connected to said wall so as to be held by the screw in a position parallel to the second clamp member.

3. In combination, a box having a side wall two cable-receiving openings spaced a short distance above the bottom wall of the box, the side wall having therein a slot lying below and between said openings, the bottom wall of the box having near the side wall and behind the slot a hole, a lower clamp member engaged with the exterior of the side wall below said openings and having an element extending loosely through said slot and then downwardly into said hole, an upper clamp member engaged with the exterior of said side wall above said openings and interlocked with that wall to enable it to move up and down while held against downward tilting movements, and a screw extending down through the middle of the upper clamp member and into the lower clamp member, the screw having a swivel connection with the upper clamp member.

4. In combination, a box having in a side wall two cable-receiving openings spaced a short distance above the bottom wall of the box, the side wall having therein a transverse slot lying below and between said openings, the bottom wall of the box having near the side wall and behind the transverse slot a hole, a lower clamp member engaged with the exterior of the side wall below said openings and having an arm extending through said slot, the arm being bent downwardly within the box and having its free end resting on the bottom wall over the hole in the latter, a finger projecting from the free end of said arm through said hole, an upper clamp member engaged with the exterior of said side wall above said openings and interlocked with that wall to enable it to move up and down while held against downward tilting movements, and a screw extending down through the middle of the upper clamp member and into the lower clamp member, the screw having a swivel connection with the upper clamp member.

5. In combination, a box having in a side wall two cable-receiving openings spaced a short distance above the bottom wall of the box, the side wall having thereon a transverse slot lying below and between said openings and a long vertical slot between and above said openings, the bottom wall of the box having near the side wall and behind the transverse slot a hole, a lower clamp member engaged with the exterior of the side wall below said openings and having an element extending loosely through said transverse slot and then downwardly into said hole, an upper clamp member engaged with the exterior of said side wall above said openings and having a headed lug extending through said vertical slot to enable it to move up and down, said upper clamp member having a deep flange lying flat against the side wall to prevent downward tilting movements of that clamp, and a screw extending down through the middle of the upper clamp member and into the lower clamp member, the screw having a swivel connection with the upper clamp member.

6. In combination, a box wall having an opening for the passage of conductors, a clamp member in the form of a shelf supported on projecting outwardly from the wall on one side and clear of said opening, a second clamp member on the outside of said wall on the other side of said opening and slidably interlocked with supported by the wall on one side of and clear of said opening to adapt it to move from and toward said shelf, and means connecting the said members together to move the second member from and toward the first member.

7. In combination, a box having in a side wall a cable-receiving opening spaced a short distance above the bottom wall of the box, the side wall having therein a slot lying below said opening, the bottom wall of the box having near the side wall and behind the slot a hole, a lower clamp member engaged with the exterior of the side wall below said openings and having an element extending through said slot and then downwardly into said hole, an upper clamp member engaged with the exterior of said side wall above said opening and interlocked with that wall to enable it to move up and down while held against downward tilting movements, and means connecting the upper clamp member and the lower clamp member to move the upper clamp member up and down.

WILLIAM GOETZELMAN.